July 26, 1938.  W. R. HARDING  2,125,108
CONTROL SYSTEM FOR GENERATORS
Filed Oct. 27, 1937
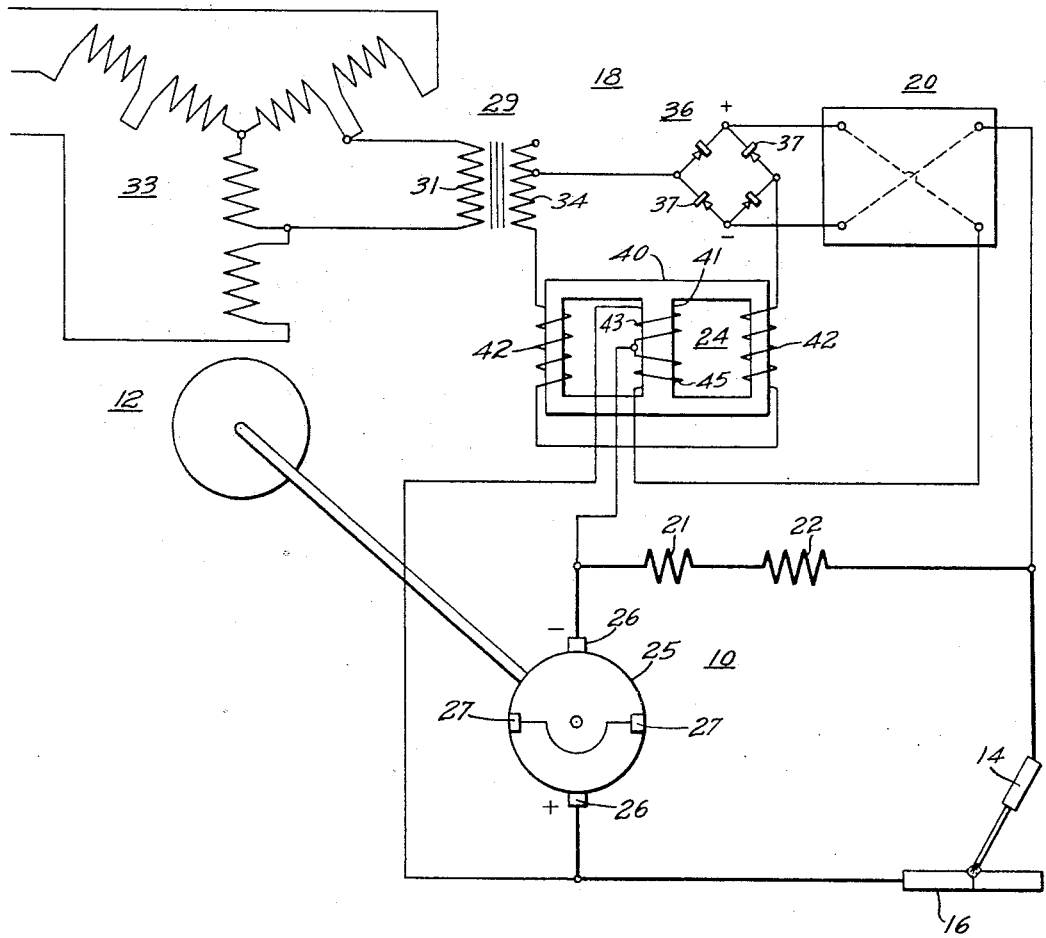
WITNESSES:
C. J. Weller.
F. V. Giolma
INVENTOR
William R. Harding.
BY G. M. Crawford
ATTORNEY

UNITED STATES PATENT OFFICE 2,125,108

CONTROL SYSTEM FOR GENERATORS

William R. Harding, Pittsburgh, Pa., assignor to Westinghouse Electric & Manufacturing Company, East Pittsburgh, Pa., a corporation of Pennsylvania Application October 27, 1937, Serial No. 171,363

11 Claims. (Cl. 171—225)

My invention relates, generally, to control systems, and it has particular reference to polarity determining control systems for use in connection with direct current generators.

It is well known in the art that direct current generators which rely mainly upon series field windings for the production of the magnetic flux therein, have relatively low open circuit voltages, as the terminal voltage before a load is applied to the machine is dependent entirely upon the residual magnetism of the field pole members. The cross-field type of generator, which, through recent development, has come into wide use in the welding industry, is primarily of the series field type and consequently has a decidedly lower open circuit voltage than many machines of other types. This characteristic has proved to be a decided disadvantage in many instances, inasmuch as the polarity of a welding generator of the cross-field type may be accidently reversed through its welding electrode coming into contact with the welding electrode of a generator of higher open circuit voltage. The current thereby caused to circulate through the series field windings of the cross-field generator is usually more than sufficient to reverse the polarity of the field pole residual magnetic flux, thus reversing the terminal polarity of the generator.

In order to overcome this disadvantage, and enable the desired terminal polarity of a generator of the cross-field type or other related type to be maintained or controlled at will, control systems utilizing separate sources of power to provide auxiliary excitation for a field pole winding of the generator have been developed. While such systems have proven satisfactory in preventing the accidental reversal of the terminal polarity of the generator, it has been found that the increase in short circuited armature current, due to the additional magnetic flux produced in the field pole member by this auxiliary excitation, often results in unsatisfactory commutation at the auxiliary brushes of a generator which shortens the life of the brushes and reduces the stability of the generator under fluctuating load conditions.

It is, therefore, an object of my invention to provide for normally limiting the flow of auxiliary excitation current in the field winding of a generator of the cross-field type.

A more specific object of my invention is to provide for so controlling the auxiliary excitation current of a generator of the cross field type that the current will be maintained at a low value during normal operation of the generator and automatically increased to a higher and more effective value upon a reverse of polarity of the generator or a reversal of the auxiliary excitation current.

Another object of my invention is to provide for utilizing a saturable reactor coupling means in connection with an auxiliary excitation system of a generator for effecting an increase in auxiliary excitation current in the field winding thereof when the polarity of the field winding is reversed or the generator polarity is reversed.

A further object of my invention is to provide an auxiliary excitation control system for a generator which is operable upon reversal of the direction of the auxiliary excitation current to momentarily increase the flow of said current and assist in the reversal of the generator terminal polarity.

Still another object of my invention is to simply and effectively improve the auxiliary brush commutation of a generator of the cross-field type which is provided with auxiliary field pole excitation and improve the stability thereof.

Other objects of my invention will, in part, be obvious and, in part, appear hereinafter.

For a complete understanding of the nature and scope of my invention, reference may be had to the single figure diagram of the accompanying drawing, which represents diagrammatically an application of a preferred form of my invention to a generator of the cross-field type.

Referring to the single figure of the drawing, the reference numeral 10 may represent a generator of the cross-field type, adapted to be driven by a motor 12 for supplying energy to a welding circuit which comprises an electrode 14 and work 16 upon which a welding operation is to be performed.

In order to maintain the desired polarity of the residual magnetic flux and prevent accidental reversal of the terminal polarity of the generator 10, and also provide for manually reversing the polarity of the generator at will, an auxiliary excitation control system, denoted generally by the reference numeral 18, may be utilized. The auxiliary excitation system may comprise a reversing switch 20 through which it is connected with a field pole winding of the generator, being either connected with the commutating field winding 21 and series field winding 22 as shown, or to a separate excitation winding to provide auxiliary excitation thereof. The reversing switch 20, which may be of any suitable type, may be utilized to effect the reversal of the auxiliary excitation current applied to these windings in order to selectively determine the polarity of the residual magnetism of the generator, and hence its terminal polarity. A saturable reactor 24 may be utilized in connection with the auxiliary excitation system 18 to limit the flow of the auxiliary excitation current during the normal operation of the generator and for the further purpose of increasing the auxiliary excitation current of the generator in response to the operation of the reversing switch 20 or an accidental reversal of the polarity of the generator, as will be explained more in detail hereinafter.

The generator 10 is provided with commutating field windings 21, series field windings 22, and an armature 25 having main brushes 26 and auxiliary brushes 27 associated therewith.

The auxiliary excitation system 18 of the cross-field generator 10 may further comprise a control transformer 29 having a primary winding 31 connected to a source of alternating current, such, for example, as the primary windings 33 of the driving motor 12, and energized therefrom. The secondary winding 34 of the control transformer 29 may be connected to a rectifier device 36 of any well known type, such as the bridge type connection of the copper oxide rectifier elements 37, as shown, for supplying a unidirectional auxiliary excitation current to the commutating field winding 21 and series field winding 22 of the generator 10, through the reversing switch 20.

In order to normally limit the flow of auxiliary excitation current through the commutating field winding 21 and series field winding 22, the saturable reactor 24 may be interposed in the circuit of the auxiliary excitation control system 18 between the secondary winding 34 of the control transformer and the rectifier device 36. As shown, the reactor 24 may comprise generally a three-legged magnetic core member 40, provided with a central leg 41. A current limiting primary winding 42 may be disposed on the two outer legs of the core member 40 and connected in series circuit relation with the secondary winding 34 of the control transformer 29 and the rectifier device 36.

In order to render the reactor 24 effective to normally limit the flow of current through the primary winding 42, while still permitting an increased current to flow therethrough upon operation of the reversing switch 20, or accidental reversal of the polarity of the generator, a secondary winding 43 may be disposed upon the central leg 41 of the core member 40 and connected with the main brushes 26 of the generators 10, while a tertiary winding 45 is likewise disposed upon the central leg 41 and connected in series circuit relation with the reversing switch 20 and the commutating field windings 21 and series field winding 22, in such a manner that the normal flow of current through these windings tends to produce equal and opposing magnetic fluxes in the central leg 41 of the core member 40.

Since the secondary winding 43 and the tertiary winding 45 of the saturable reactor are connected so that the normal directions of current flow tend to produce equal magnetic fluxes which oppose each other, it may be seen that the resultant magnetic flux produced in the central leg 41 of the core member 40 by these windings is substantially zero. The primary winding 42 will, under these circumstances, be unaffected by the magnetic flux of these windings, and will have a relatively high impedance, thus greatly limiting the flow of alternating current from the secondary winding 34 of the control transformer 29 to the rectifier 36, and thereby normally limiting the flow of auxiliary excitation current supplied by the rectifier 36 to the commutating field winding 21 and series field winding 22 of the generator 10. By so limiting the flow of excitation current through these field windings of the generator, any increase in the residual magnetism of the generator therefrom is normally kept to a minimum, and the cross-field magnetizing armature current, which is generated by this flux and flows through the short-circuited auxiliary brushes 27 of the generator, may be kept within desired limits.

When it is desired to reverse the terminal polarity of the generator, the reversing switch 20 may be operated and the direction of auxiliary excitation current through the field windings of the generator 10, reversed. Since the tertiary winding 45 of the saturable reactor 24 is connected in series circuit relation with the reversing switch 20 and the field windings 21 and 22 of the generator, the direction of current flow through the tertiary winding 45 will also be reversed, and the magnetic flux produced by the tertiary winding 45 in the central leg 41 of the reactor core member 40 will now be in the same direction as the flux produced therein by the secondary winding 43, thereby saturating the saturable core member 40. Saturation of the core member 40 greatly reduces the impedance of the primary winding 42, thereby permitting an increased flow of alternating current from the secondary winding 34 of the control transformer 29 to the rectifier 36, and accordingly, increasing the flow of auxiliary excitation current through the reversing switch 20 and through the field windings of the generator 10. Reversal of the residual magnetism of the generator is thereby greatly facilitated, definitely reversing the terminal polarity thereof. As soon as the terminal polarity of the generator reverses, the direction of current flow through the secondary winding 43 will also reverse, and the impedance of the primary winding 42 will accordingly increase again, limiting once more the flow of auxiliary excitation current supplied to the field pole windings.

The auxiliary reactor 24 also functions to momentarily increase the auxiliary excitation current upon accidental reversal of the polarity of the generator. In this instance the current flowing in the winding 45 of the reactor becomes reversed which causes its flux to become additive with respect to that produced by the winding 43 and the impedance of the reactor decreased as before. This effects an increased flow of auxiliary excitation current until the polarity of the generator is again reversed to correspond to the position of the reversing switch 20.

It may, therefore, be seen that through my invention it is now possible to maintain the terminal polarity of a generator of the cross-field type without unduly increasing the flow of current in the short-circuited auxiliary brush circuit. I have furthermore shown how it is possible in a simple and effective mainer to normally limit the flow of current in the auxiliary brush circuit of a cross-field type of generator, and at the same time maintain the desired terminal polarity while ensuring a quick and positive change of the terminal polarity upon operation of the polarity reversing switch or a return to the desired polarity in the event of an accidental reversal of polarity.

Since certain changes may be made in the above construction, and different embodiments of the invention may be made without departing from the spirit thereof, it is intended that all matter contained in the above description or shown in the accompanying drawing shall be considered as illustrative, and not in a limiting sense.

I claim as my invention:

1. In a control system for a dynamo-electric machine having a plurality of field pole windings, a source of power, means including a polarity reversing switch for connecting one of said field pole windings to said source of power to provide for auxiliary excitation thereof, and means for normally limiting the flow of auxiliary excitation current in the field pole winding operable to momentarily increase the flow of auxiliary excitation current either upon operation of said reversing switch or an accidental reversal of the polarity of the machine.

2. In combination, a dynamo-electric machine having a plurality of field pole excitation windings, an independent source of power, means including a reversing switch connected with said source for providing a substantially constant source of auxiliary excitation current for one of said field pole windings, impedance means for limiting the normal flow of auxiliary excitation current in said winding, and circuit means connected with said field pole winding for decreasing the impedance of said impedance means either upon operation of said switch or accidental reversal of the polarity of the machine to increase the flow of auxiliary excitation current.

3. In combination, a dynamo-electric machine having a plurality of field pole windings, control means comprising a source of power and switch means for supplying an auxiliary polarity determining potential to a field pole winding of the machine to determine the terminal polarity thereof, and means cooperative with said control means for limiting the normal value of said potential, said means being disposed to increase the value of potential applied to said winding in response to a reversal of the polarity of the generator.

4. In combination, a dynamo-electric machine having a plurality of field pole excitation windings, a separate source of power, circuit means including a polarity reversing switch for connecting one of said field windings to the separate source to provide an auxiliary source of excitation for at least one of said field pole windings, and variable impedance means associated with said circuit means and being jointly responsive to the auxiliary excitation current and the polarity of the machine for varying the impedance of said circuit means and increasing the auxiliary excitation of said field pole winding either upon operation of said reversing switch or an accidental reversal of the polarity of the machine.

5. In combination, a dynamo-electric machine of the cross-field type having a plurality of field pole excitation windings, a separate alternating current source, an auxiliary excitation circuit including a unidirectional current device and switch means for selectively connecting one of said field pole windings to the separate source, impedance means interposed between the unidirectional current device and the source to limit the current flow therethrough, and a plurality of associated windings disposed in normally opposed relation on the impedance means for connection with the auxiliary excitation circuit and the output circuit of the dynamo-electric machine for decreasing the impedance of said impedance means upon operation of the switch means.

6. In combination, a dynamo-electric machine of the cross-field type having a plurality of field pole excitation windings, a separate source of alternating current, means including a rectifier and a polarity determining switch for connecting one of said field pole windings to the source to provide auxiliary field pole excitation, and impedance means disposed in connection with the separate source and the output circuit of the dynamo-electric machine for normally limiting the flow of auxiliary excitation current.

7. In combination, a dynamo-electric machine having a plurality of field pole windings, a separate source of alternating current power, an auxiliary excitation control circuit including rectifying means and a polarity reversing switch for connecting a field pole winding to said source, a variable impedance device interposed between the source and the control circuit for normally limiting the flow of current therethrough, and opposed direct current windings disposed on the impedance device in connection with the dynamo-electric machine and the auxiliary control circuit for decreasing the impedance of the impedance device to permit an increased flow of auxiliary excitation current upon operation of said reversing switch.

8. In combination, a welding generator of the cross-field type having a plurality of field pole excitation windings, a source of alternating current, circuit means including a unidirectional current device and a polarity reversing switch for supplying auxiliary excitation current for one of said field windings, variable impedance means connected with said circuit means, and additional circuit means for connecting the variable impedance means with said winding and to the generator output circuit to decrease the impedance of said first mentioned circuit means upon operation of said switch, thereby to effect an increased flow of auxiliary excitation current.

9. In combination, a dynamo-electric machine of the cross-field type having a plurality of field pole excitation windings, an alternating current source, means including a rectifier and a polarity determining switch for connecting at least one of said field pole windings to said source to provide auxiliary excitation current therefor, variable impedance means interposed between the source and aforesaid means for limiting the normal flow of auxiliary excitation current, and a pair of normally opposed direct current excitation windings associated with the impedance means, one of said windings being disposed in connection with the machine output circuit, and the other of said windings being interposed between said switch and said field pole excitation winding to reduce the impedance of said impedance means upon operation of said switch.

10. The combination in a cross-field type of generator of, a plurality of field pole excitation windings, an alternating current source, an auxiliary control circuit including rectified means and switch means for selectively connecting one of said field pole windings to said source for auxiliary excitation thereof, a current limiting saturable reactor having a plurality of windings including a tertiary control winding, one of said windings being interposed between the source and the control circuit, a second winding being disposed in connection with the generator output circuit, and the tertiary control winding opposed in relation to the second winding disposed to be interposed in the auxiliary control circuit for reducing the impedance of said reactor upon reversal of the excitation current of said field pole winding to permit an increase in said excitation current.

11. In combination, a direct current generator of the cross-field type, a source of auxiliary excitation current for the generator, circuit means connecting said source to the series field winding of the generator and reactor means interposed in said circuit means normally effective to limit the flow of auxiliary excitation current to a relatively low value and operable in response to a reversal of the generator polarity to increase the flow of the auxiliary excitation current.

WILLIAM R. HARDING.